United States Patent
Kwon et al.

(10) Patent No.: US 9,887,394 B2
(45) Date of Patent: Feb. 6, 2018

(54) RECHARGEABLE BATTERY INCLUDING FLUORESCENT COATING LAYER

(71) Applicant: SAMSUNG SDI CO., LTD., Yongin-si, Gyeonggi-do (KR)

(72) Inventors: Tae-Ho Kwon, Yongin-si (KR); Tae-Hyun Hwang, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 245 days.

(21) Appl. No.: 14/837,067

(22) Filed: Aug. 27, 2015

(65) Prior Publication Data
US 2016/0261010 A1 Sep. 8, 2016

(30) Foreign Application Priority Data
Mar. 6, 2015 (KR) .................. 10-2015-0031644

(51) Int. Cl.
*H01M 2/02* (2006.01)
*H01M 10/48* (2006.01)
*H01M 2/04* (2006.01)

(52) U.S. Cl.
CPC ....... *H01M 2/0287* (2013.01); *H01M 2/0491* (2013.01); *H01M 10/48* (2013.01); *H01M 2/024* (2013.01); *H01M 2/0217* (2013.01); *H01M 2/0426* (2013.01); *H01M 2/0473* (2013.01)

(58) Field of Classification Search
None
See application file for complete search history.

(56) References Cited

U.S. PATENT DOCUMENTS

| | | | |
|---|---|---|---|
| 4,999,265 A * | 3/1991 | Dopp ...................... | H01M 6/02 29/623.2 |
| 6,106,969 A * | 8/2000 | Lian .................... | H01M 10/488 429/90 |
| 2002/0106559 A1* | 8/2002 | Takahashi ................ | H01G 9/10 429/185 |
| 2005/0069761 A1* | 3/2005 | Palanisamy ............ | H01G 9/022 429/90 |
| 2006/0134511 A1* | 6/2006 | Ito ....................... | H01M 6/5044 429/90 |
| 2007/0202364 A1* | 8/2007 | Uh ...................... | H01M 2/0404 429/7 |

FOREIGN PATENT DOCUMENTS

| | | | |
|---|---|---|---|
| JP | 2002359010 A | * | 12/2002 |
| JP | 2004247141 A | * | 9/2004 |
| KR | 10-2006-0023472 A | | 3/2006 |
| KR | 10-2014-0000997 A | | 1/2014 |

\* cited by examiner

*Primary Examiner* — Maria Laios
*Assistant Examiner* — Robert S Carrico
(74) *Attorney, Agent, or Firm* — Lee & Morse, P.C.

(57) ABSTRACT

A rechargeable battery including an electrode assembly including a first electrode and a second electrode; electrode terminals electrically coupled to the electrode assembly; a case in which the electrode assembly is placed; a cap plate in an opening of the case to seal the case, the cap plate including a vent hole; and a fluorescent coating between the cap plate and the opening of the case.

5 Claims, 7 Drawing Sheets

RECHARGEABLE BATTERY INCLUDING FLUORESCENT COATING LAYER

CROSS-REFERENCE TO RELATED APPLICATION

Korean Patent Application No. 10-2015-0031644, filed on Mar. 6, 2015, in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

A rechargeable battery differs from a primary battery in that it may be repeatedly charged and discharged, while a primary battery is incapable of being recharged. A low-capacity rechargeable battery may be used in small portable electronic devices such as mobile phones, notebook computers, and camcorders, while a high-capacity rechargeable battery may be used as a power source for driving a motor of a hybrid vehicle.

SUMMARY

Embodiments may be realized by providing a rechargeable battery including an electrode assembly including a first electrode and a second electrode; electrode terminals electrically coupled to the electrode assembly; a case in which the electrode assembly is placed; a cap plate in an opening of the case to seal the case, the cap plate including a vent hole; and a fluorescent coating between the cap plate and the opening of the case.

The fluorescent coating may be on one or more of a lateral surface of the cap plate or an inner wall surface of the opening of the case.

The fluorescent coating may include a first coating on a circumference of the inner wall surface of the opening of the case; and a second coating on the lateral surface of the cap plate to face the first coating.

The second coating may be on a lower circumference of an edge of the cap plate and may have a thickness of 40% or less a thickness of the edge of the cap plate.

The first coating may be on an upper end of the inner wall surface of the case and may have a same width as a thickness of the cap plate.

An edge of the cap plate may include a tapered surface, and the fluorescent coating may be on the tapered surface.

The fluorescent coating may be on 40% or less of an entire width of the tapered surface.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
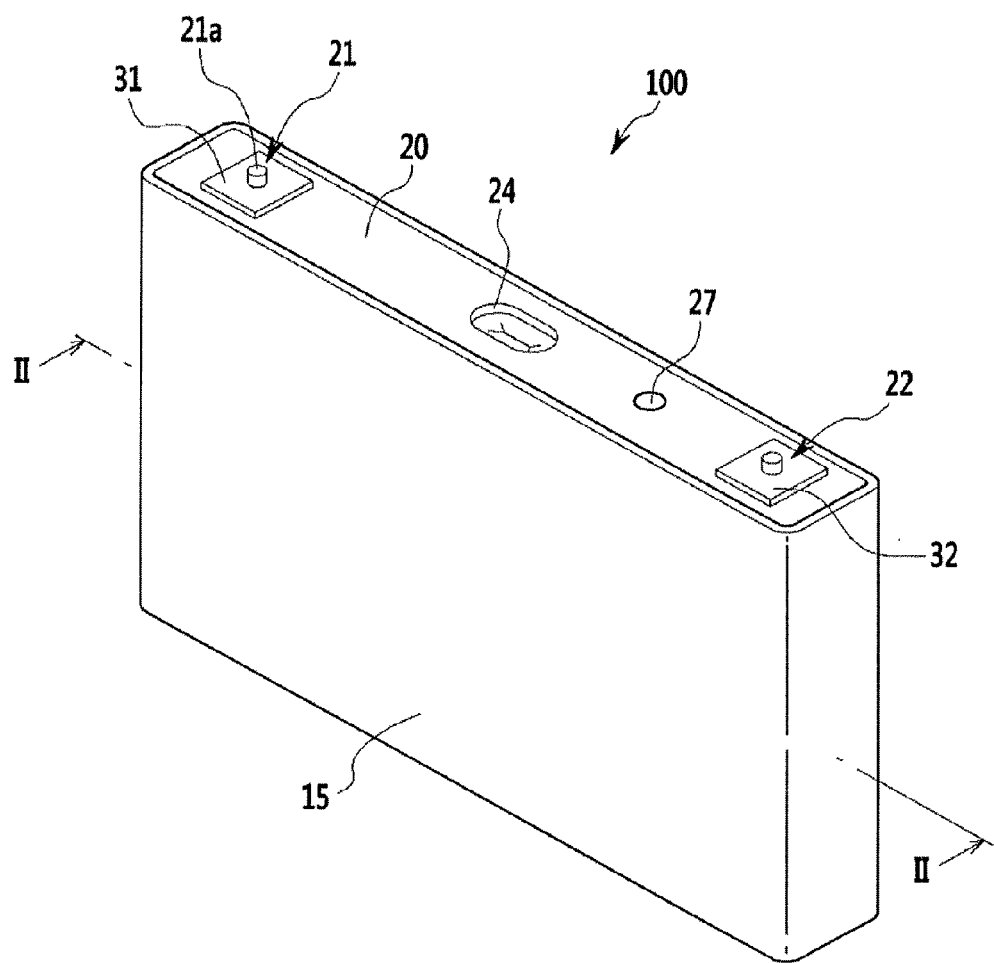
FIG. 1 illustrates a schematic perspective view of a rechargeable battery according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
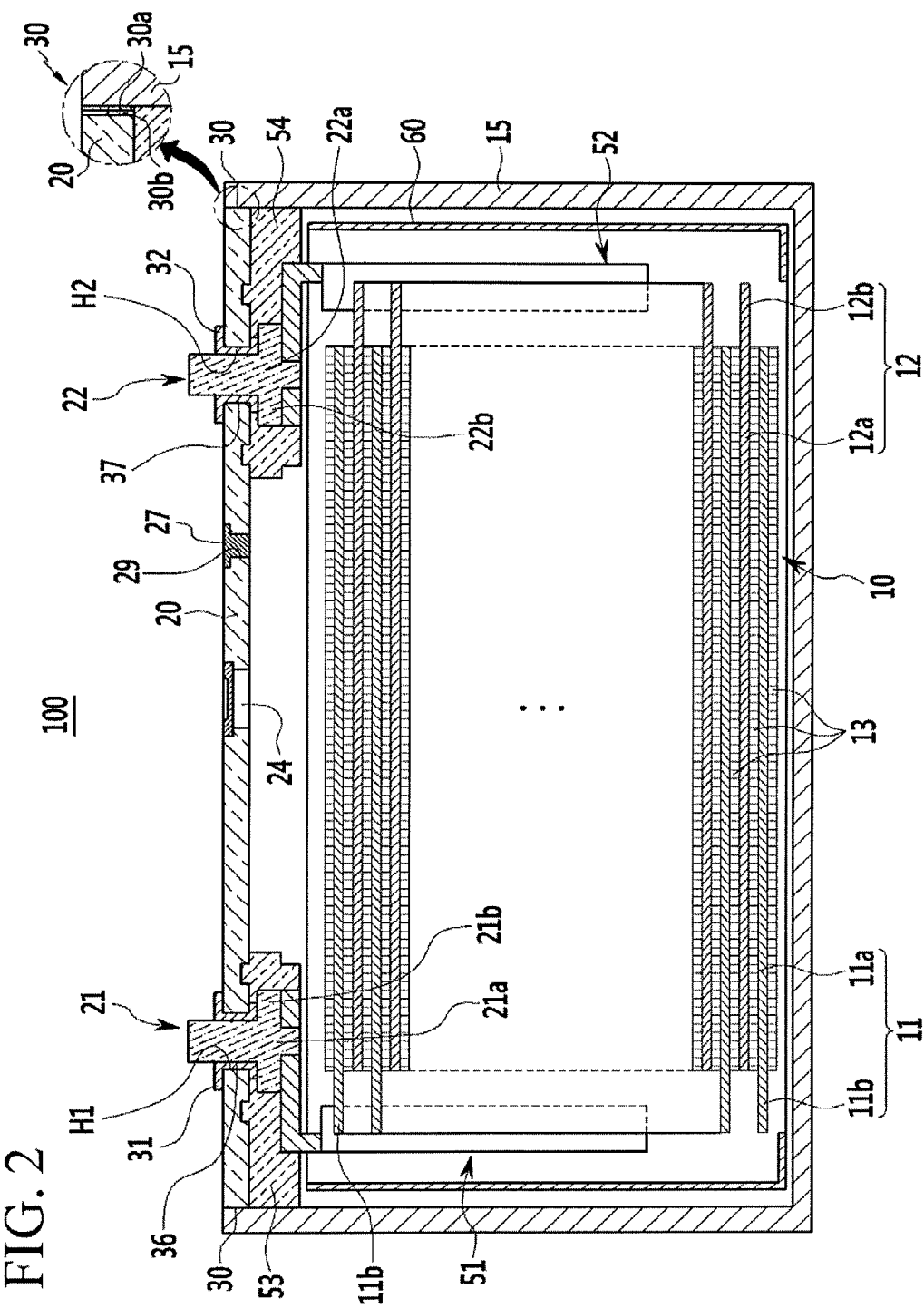
FIG. 2 illustrates a cross-sectional view of the rechargeable battery of FIG. 1 taken along the line II-II.

FIG. 1 illustrates a schematic perspective view of a rechargeable battery according to a first exemplary embodiment, and FIG. 2 illustrates a cross-sectional view of the rechargeable battery of FIG. 1 taken along the line II-II.

As shown in FIGS. 1 and 2, the rechargeable battery 100 according to the first exemplary embodiment may include: an electrode assembly 10 including a first electrode 11 and a second electrode 12; electrode terminals 21 and 22 electrically coupled to the electrode assembly 10; a case 15 in which the electrode assembly 10 is placed; a cap plate 20 provided in an opening of the case 15 to seal the case 15 and formed with a vent hole 24; and a fluorescent coating 30 applied between the cap plate 20 and the opening.

For example, the electrode assembly 10 may be formed by disposing the first electrode (hereinafter referred to as a "negative electrode") 11 and the second electrode (hereinafter referred to as a "positive electrode") 12 at opposite sides of a separator 13, which may serve as an insulator, and then spirally winding the negative electrode 11, the separator 13, and the positive electrode 12 in a jelly roll state.

The positive and negative electrodes 11 and 12 may respectively include coated regions 11a and 12a where an active material is coated on a current collector made of a metal plate, and uncoated regions 11b and 12b having exposed portions of the current collector on which the active material is not coated.

For example, the case 15 may substantially be formed as a cuboid, in which a space for accommodating the electrode assembly 10 and an electrolyte solution may be set, and the opening may be formed at one side of the cuboid to connect inner and outer spaces of the case 15. The opening may allow the electrode assembly 10 to be inserted into the case 15.

The cap plate 20 may be installed in the opening of the case 15 to seal the case 15. For example, the case 15 and the cap plate 20 may be formed of aluminum, and the case 15 and the cap plate 20 may be welded to each other.

An electrolyte injection opening 29, the vent hole 24, and terminal holes H1 and H2 may be provided in the cap plate 20. After the cap plate 20 is combined to the case 15, the electrolyte injection opening 29 may allow the electrolyte solution to be injected into the case 15. After being injected with the electrolyte solution, the electrolyte injection opening 29 may be sealed by a sealing cap 27.

The fluorescent coating 30 may be formed between the cap plate and the opening of the case.

Figure 3:
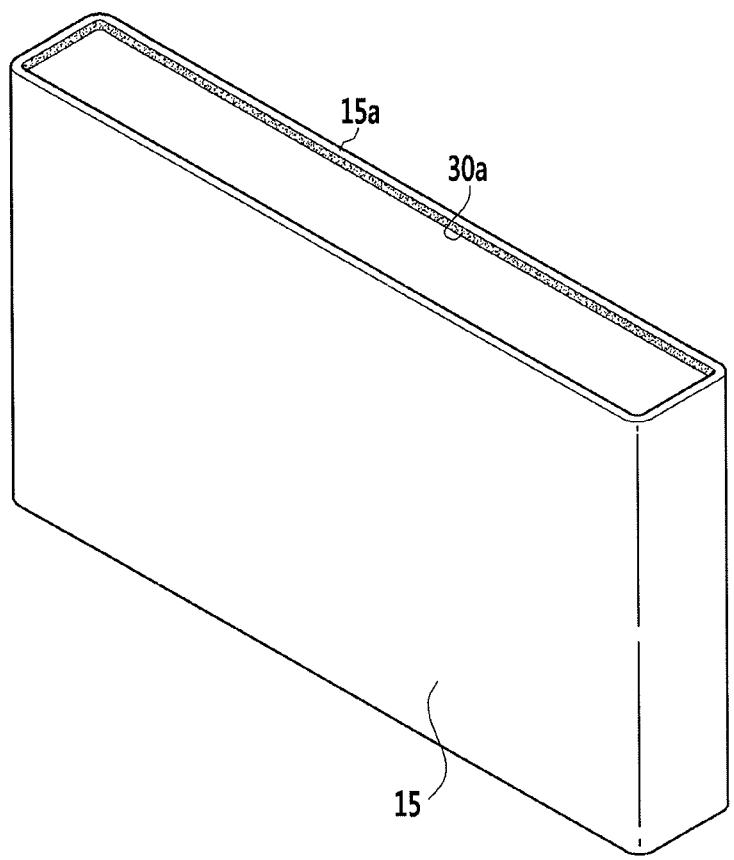
FIG. 3 illustrates a schematic perspective view of a case of FIG. 1 to which a first coating is applied.

FIG. 3 illustrates a schematic perspective view of a case of FIG. 1 to which a first coating is applied, and FIG. illustrates is a schematic perspective view of a lateral surface of a cap plate of FIG. 1 to which a second coating is applied.

Figure 4:
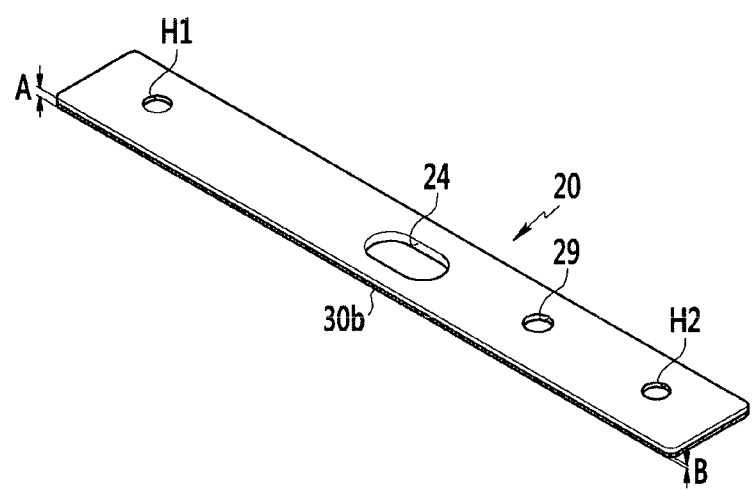
FIG. 4 illustrates a schematic perspective view of a lateral surface of a cap plate of FIG. 1 to which a second coating is applied.

As shown in FIGS. 3 and 4, the fluorescent coating 30 may be formed at each of an inner wall surface of the opening 15*a* of the case 15 and lateral edge surfaces of the cap plate 20. The fluorescent coating 30 may be formed at each of the inner wall surface of the case 15 and the lateral surface of the cap plate 20 to check whether an electrolyte solution leaks out of the case 15. This will be described later in more detail.

The fluorescent coating 30 may include a first coating 30*a* applied to the inner wall surface of the opening 15*a* of the case 15, and a second coating 30*b* applied to the lateral surface of the cap plate 20 to face the first coating 30*a*.

As shown in FIG. 3, the first coating 30*a* may be applied along a circumference of an upper end portion of the opening 15*a* at the inner wall surface of the case 15. The first coating 30*a* may include a fluorescent material that may be dissolved upon contacting the electrolyte solution inside the rechargeable battery 100. If electrolyte solution including the fluorescent material leaks between the case 15 and the cap plate 20, the first coating 30*a* may leak out of the case along with the electrolyte solution, and it may be possible to easily check leakage of the electrolyte solution if an abnormality of the rechargeable battery 100 occurs. The first coating 30*a* may be applied to the inner wall surface of the case 15, and may have a same width as a thickness of the cap plate 20.

As shown in FIG. 4, the second coating 30*b* may be applied to a lateral edge surface of the cap plate 20 along a circumference thereof. The second coating 30*b* may be made of the same material as the first coating 30*a*, and the second coating 30*b* may include a fluorescent material. If electrolyte solution leaks out of the case 15, for example, due to an abnormality of the rechargeable battery 100, the second coating 30*b* partially dissolved in the electrolyte solution may also leak out of the case 15.

The second coating 30*b* may be applied along the circumference of the cap plate 20, and may have a smaller width than a thickness (A) of the lateral surface of the cap plate 20. The second coating 30*b* applied to the cap plate 20 may have a smaller thickness than the cap plate 20, and the second coating 30*b* may avoid welding heat generated when the cap plate 20 is welded to the case 15.

The second coating 30*b* may be applied along a lower circumference of the edge of the cap plate 20 to avoid the welding heat. In the current exemplary embodiment, the second coating 30*b* may be applied along the lateral surface of the cap plate 20, and the second coating 30*b* may have a thickness of 40% or less of the thickness of the cap plate 20.

As described above, the first coating 30*a* and the second coating 30*b* may be respectively applied to the lateral surface of the cap plate 20 and the inner wall surface of the case 15, and may face each other. Whether or not electrolyte solution leaks out of the case 15, for example, due to abnormality inside the rechargeable battery 100, may be easily checked by the fluorescent material that is included in the first coating 30*a* or the second coating 30*b*.

The electrode terminals 21 and 22 may include a negative terminal 21 and a positive electrode terminal 22, and may be provided in the terminal holes H1 and H2 of the cap plate 20 and may be electrically coupled to the electrode assembly 10. The negative terminal 21 may be electrically coupled to the negative electrode 11 of the electrode assembly 10, and the positive electrode terminal 22 may be electrically coupled to the positive electrode 12 of the electrode assembly 10. The electrode assembly 10 may be drawn out of the case 15 through the negative and positive electrode terminals 21 and 22.

The electrode terminals 21 and 22 will be described in more detail. The electrode terminals 21 and 22 may include rivet terminals 21*a* and 22*a* that may be provided in the terminal holes H1 and H2 of the cap plate 20 to be electrically coupled to the electrode assembly 10.

One end of the rivet terminal 21*a* may be electrically coupled to the electrode assembly 10 inside the case 15, for example, by welding. The other end of the rivet terminal 21*a* may protrude out of the terminal holes H1 and H2.

Negative and positive electrode gaskets 36 and 37 may respectively be provided between the rivet terminals 21*a* and 22*a* of the negative and positive electrode terminals 21 and 22 and inner surfaces of the terminal holes H1 and H2 of the cap plate 20, and the negative and positive electrode gaskets 36 and 37 may provide sealing and electrical insulation between the rivet terminals 21*a* and 22*a* of the negative and positive electrode terminals 21 and 22 and the cap plate 20.

Negative and positive current collecting tabs 51 and 52 may allow the negative and positive electrode terminals 21 and 22 to be respectively electrically coupled to the negative and positive terminals 11 and 12 of the electrode assembly 10. By combining the negative and positive current collecting tabs 51 and 52 to lower ends of the rivet terminals 21*a* and 22*a* and then caulking the lower ends thereof, the negative and positive current collecting tabs 51 and 52 may be supported by flanges 21*b* and 22*b* and may be coupled to the lower ends of the rivet terminals 21*a* and 22*a*.

Lower insulating members 53 and 54 may respectively be provided between the negative and positive current collecting tabs 51 and 52 and the cap plate 20 to electrically insulate the negative and positive current collecting tabs 51 and 52 from the cap plate 20. One side of each of the lower insulating members 53 and 54 may be combined to the cap plate 20, and the other side may enclose the negative and positive current collecting tabs 51 and 52, the rivet terminals 21*a* and 22*a*, and the flanges 21*b* and 22*b*, and a connecting structure therebetween may be stabilized.

An upper insulating member 31 near the negative terminal 21 may provide electrical insulation between the negative terminal 21 and the cap plate 20.

The upper insulating member 31 may be interposed between the negative terminal 21 and the cap plate 20, and may be penetrated by the rivet terminal 21*a*. By combining the upper insulating member 31 to an upper end of the rivet terminal 21*a* and then caulking the upper end thereof, the upper insulating member 31 may be combined to the upper end of the rivet terminal 21*a*.

A top plate 32 near the positive electrode terminal 22 may be formed as a conductive member, and may be provided between the positive electrode terminal 22 and the cap plate 20, and the cap plate 20 may be electrically coupled thereto. The cap plate 20 may maintain a state of being electrically coupled to the electrode assembly 10 through the positive electrode terminal 22.

For example, the top plate 32 may be interposed between the plate terminal 22*c* and the cap plate 20, and may be penetrated by the rivet terminal 22*a*. By combining the top plate 32 to an upper end of the rivet terminal 22*a* and then caulking the upper end thereof, the top plate 32 may be combined to the upper end of the rivet terminal 22a.

Figure 5:
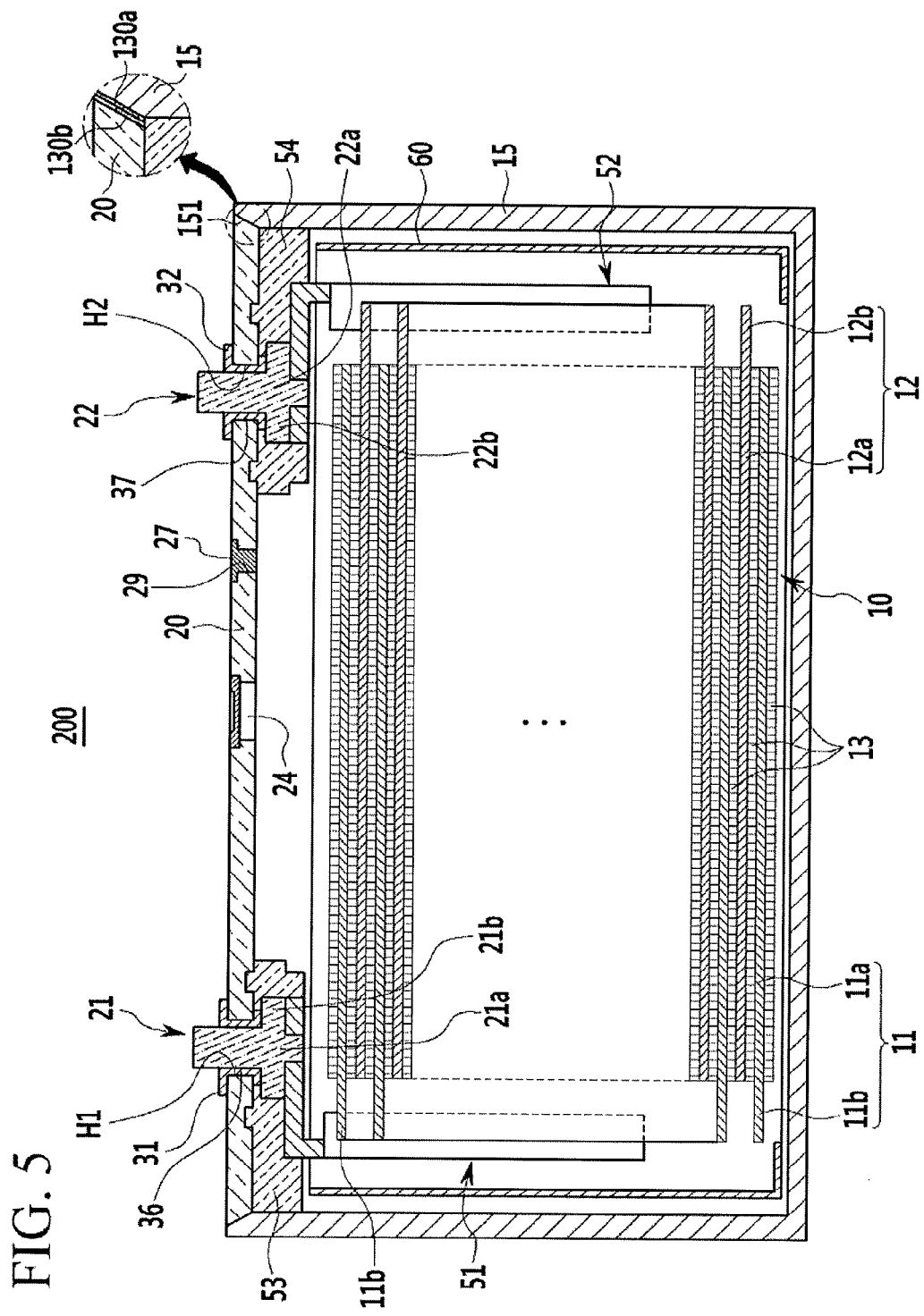
FIG. 5 illustrates a schematic perspective view of a rechargeable battery according to a second exemplary embodiment.
Figure 6:
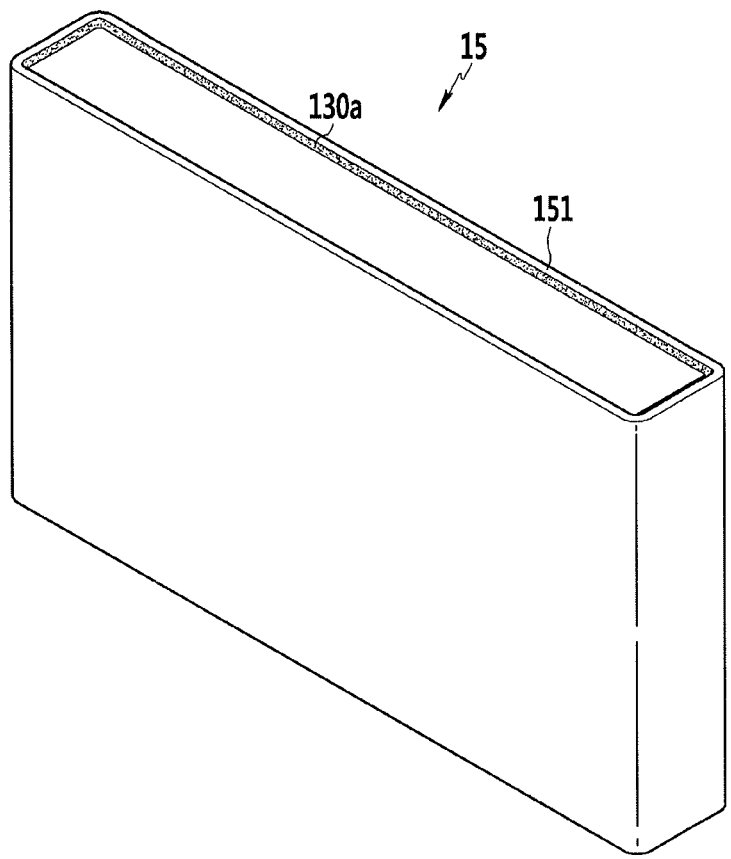
FIG. 6 illustrates a schematic perspective view of a case of FIG. 5 to which a first coating is applied.
Figure 7:
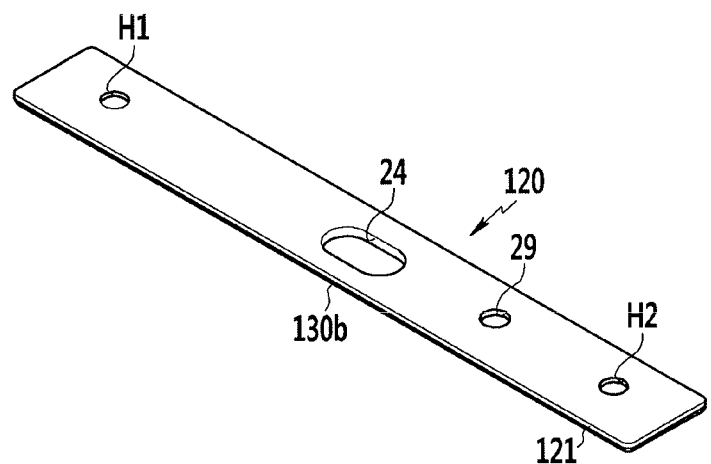
FIG. 7 illustrates a schematic perspective view of a lateral surface of a cap plate of FIG. 5 to which a second coating is applied.

FIG. 5 illustrates a schematic perspective view of a rechargeable battery according to a second exemplary embodiment, FIG. 6 illustrates a schematic perspective view of a case of FIG. 5 to which a first coating is applied, and FIG. 7 illustrates a schematic perspective view of a lateral surface of a cap plate of FIG. 5 to which a second coating is applied. The same reference numerals as those in FIGS. 1 to 4 refer to the same members having the same functions. A detailed description of the same reference numerals will be omitted hereafter.

As shown in FIGS. 5 to 7, in the rechargeable battery 200 according to the second exemplary embodiment, a tapered surface 121 may be formed at a lateral surface of a cap plate 120. While contacting an opening 151 of the case 15, the tapered surface 121 may be welded thereto.

A first coating 130a may be applied to an inner wall surface of the opening 151 of the case 15. A second coating 130b may be applied to the tapered surface 121 of the cap plate 120, and while the cap plate 120 is being welded to the opening 151 of the case 15, it may be possible to transfer a minimum amount of welding heat to the first coating 130a or the second coating 130b.

By way of summation and review, rechargeable batteries include, for example, nickel-cadmium (Ni—Cd) batteries, nickel-metal hydride (Ni—MH) batteries, lithium (Li) batteries, lithium ion (Li-ion) batteries. For example, a lithium ion rechargeable battery that may be used as a power supply for electronic devices may have an operating voltage about three times as high as that of a Ni—Cd battery or a Ni—MH battery. A lithium ion rechargeable battery may be used because of its relatively high energy density per unit weight.

In a rechargeable battery, a lithium-based oxide may be used as a positive active material, and a carbon material may be used as a negative active material. Batteries may be classified as liquid electrolyte batteries and polymer electrolyte batteries depending on the type of electrolyte, and lithium batteries using a liquid electrolyte may be called lithium ion batteries, and batteries using a polymer electrolyte may be called lithium polymer batteries.

If an external impact is delivered to a rechargeable battery, cracks may be generated between a case and a cap plate, and leakage of an electrolyte solution from inside of the rechargeable battery may be caused. It may be difficult for a user to quickly check whether electrolyte solution is leaking, and such a check must be done carefully.

Provided is a rechargeable battery that may enable a quick and correct leakage check of an electrolyte solution.

According to the exemplary embodiment, a fluorescent coating including a fluorescent material may be applied between a case and a cap plate of a rechargeable battery. It may be possible to easily check whether electrolyte solution leaks out of the case or not, for example, due to an internal abnormality of the rechargeable battery, since the electrolyte solution may be discharged along with the fluorescent coating that may be partially dissolved therein.

Whether the electrolyte solution of the rechargeable battery leaks or not may be visually checked quickly, and occurrence of additional damage associated with the leakage of the electrolyte solution may be prevented.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery comprising:
   an electrode assembly including a first electrode and a second electrode;
   electrode terminals electrically coupled to the electrode assembly;
   a case in which the electrode assembly is placed;
   a cap plate in an opening of the case to seal the case, the cap plate including a vent hole; and
   a fluorescent coating between the cap plate and the case, wherein the fluorescent coating includes:
      a first coating on a circumference of an inner wall surface of the opening of the case; and
      a second coating on a lateral surface of the cap plate and facing the first coating.

2. The rechargeable battery as claimed in claim 1, wherein the second coating is on a lower circumference of an edge of the cap plate and has a thickness of 40% or less a thickness of the edge of the cap plate.

3. The rechargeable battery as claimed in claim 1, wherein the first coating is on an upper end of the inner wall surface of the case and has a same width as a thickness of the cap plate.

4. The rechargeable battery as claimed in claim 1, wherein:
   an edge of the cap plate includes a tapered surface, and
   the second coating is on the tapered surface.

5. The rechargeable battery as claimed in claim 4, wherein the fluorescent coating is on 40% or less of an entire width of the tapered surface.

* * * * *